(12) United States Patent
Swain et al.

(10) Patent No.: US 7,003,985 B2
(45) Date of Patent: Feb. 28, 2006

(54) METHOD AND APPARATUS FOR REMOVING POLYMERIC COATINGS FROM OPTICAL FIBER IN A NON-OXIDIZING ENVIRONMENT

(76) Inventors: Robert F. Swain, Sandy Lodge, Sandy Lane, Broadclyst, Exeter EX5 3AN (GB); Andrew D. Yablon, 502 W. 113th St., Apt. 3D, New York, NY (US) 10025

( * ) Notice: Subject to any disclaimer, the term of this patent is extended or adjusted under 35 U.S.C. 154(b) by 169 days.

(21) Appl. No.: 09/968,094

(22) Filed: Oct. 1, 2001

(65) Prior Publication Data

US 2003/0061837 A1 Apr. 3, 2003

(51) Int. Cl.
C03C 25/70 (2006.01)
B08B 7/00 (2006.01)

(52) U.S. Cl. .............................. 65/473; 65/424; 65/503; 65/509; 65/DIG. 9; 134/15; 134/21; 219/539; 373/27; 373/110; 373/117

(58) Field of Classification Search .................. 65/473, 65/424, 157, 335, 346, 502, 509, 532, DIG. 4, 65/900; 156/344, 584; 134/15, 19, 21; 219/50, 219/72–74, 155, 156, 162, 538, 539, 260; 373/5, 27, 28, 110, 117–122
See application file for complete search history.

(56) References Cited

U.S. PATENT DOCUMENTS

| | | | |
|---|---|---|---|
| 1,824,056 A | | 9/1931 | Power |
| 2,083,407 A | | 6/1937 | Scranton |
| 2,383,469 A | * | 8/1945 | Colbert et al. .............. 427/166 |
| 3,374,114 A | | 3/1968 | Wiener |
| 3,582,616 A | * | 6/1971 | Wrob ......................... 219/541 |
| 3,635,454 A | | 1/1972 | Angelo et al. |
| 3,728,144 A | | 4/1973 | Van Poucke |
| 3,881,902 A | * | 5/1975 | DeLuca ....................... 65/507 |
| 3,984,614 A | * | 10/1976 | Isaksson ..................... 373/111 |
| 4,089,790 A | | 5/1978 | Adams |
| 4,208,221 A | | 6/1980 | Rosen |
| 4,220,480 A | | 9/1980 | Dwan |
| 4,304,582 A | * | 12/1981 | Aussenegg et al. .......... 65/488 |
| 4,490,828 A | * | 12/1984 | Fukuhara et al. .......... 373/117 |
| 4,821,410 A | | 4/1989 | Pierpoint |
| 4,902,323 A | * | 2/1990 | Miller et al. ................. 65/407 |
| 5,070,232 A | | 12/1991 | Martin |
| 5,360,464 A | | 11/1994 | Yamauchi et al. |
| 5,401,321 A | | 3/1995 | Hugo et al. |
| 5,770,132 A | | 6/1998 | Yamamura et al. |
| 5,922,098 A | * | 7/1999 | Tsuneishi et al. ............. 65/384 |
| 5,939,136 A | * | 8/1999 | Cronk et al. ............. 427/163.2 |
| 5,948,202 A | | 9/1999 | Miller |
| 5,949,940 A | | 9/1999 | Botelho et al. |
| 5,954,974 A | * | 9/1999 | Broer et al. .................... 216/2 |
| 5,968,283 A | * | 10/1999 | Walraven et al. ............. 134/19 |

(Continued)

FOREIGN PATENT DOCUMENTS

| | | | |
|---|---|---|---|
| JP | 32041 | * | 2/1983 |
| JP | 58-032041 | | 2/1983 |
| JP | 60-149003 | | 6/1985 |
| JP | 1-179708 | | 7/1989 |
| JP | 1-232303 | | 9/1989 |
| JP | 8-248234 | | 9/1996 |

*Primary Examiner*—Eric Hug
(74) *Attorney, Agent, or Firm*—Lowenstein Sandler PC

(57) ABSTRACT

In accordance with the invention, the polymeric coating is removed from a coated optical fiber by disposing the fiber within a non-oxidizing environment and applying sufficient heat to volatilize at least a portion of the polymeric coating. The result is that the coating material bursts from the fiber, yielding a clean glass surface virtually free of surface flaws. In a preferred embodiment the non-oxidizing environment is inert gas and the heat is provided by resistive filament heaters.

18 Claims, 2 Drawing Sheets

U.S. PATENT DOCUMENTS

| | | | |
|---|---|---|---|
| 5,985,448 A | * 11/1999 | Koenig | 428/397 |
| 6,207,931 B1 | 3/2001 | Loser et al. | |
| 6,402,856 B1 | * 6/2002 | Vetrano | 134/19 |
| 6,436,198 B1 | 8/2002 | Swain et al. | |
| 6,437,299 B1 | * 8/2002 | Watanabe et al. | 219/478 |
| 6,490,023 B1 | 12/2002 | Levy et al. | |
| 6,607,608 B1 | 8/2003 | Vetrano et al. | |
| 6,799,383 B1 | 10/2004 | Wiley | |
| 2001/0023598 A1 | 9/2001 | Kohmura et al. | |
| 2001/0047669 A1 | 12/2001 | Digonnet et al. | |
| 2002/0008213 A1 | 1/2002 | Kawada | |
| 2003/0062070 A1 | 4/2003 | Swain et al. | |

* cited by examiner

METHOD AND APPARATUS FOR REMOVING POLYMERIC COATINGS FROM OPTICAL FIBER IN A NON-OXIDIZING ENVIRONMENT

CROSS REFERENCE TO RELATED APPLICATIONS

This application is related to U.S. patent application Ser. No. 09/968,211 filed by the present inventors concurrently herewith and entitled "Method and Apparatus For Removing Polymeric Coatings From Optical Fiber", which is incorporated herein by reference.

FIELD OF THE INVENTION

The invention relates to methods for removing polymeric coatings from optical fiber and to apparatus for practicing such methods. In particular it relates to an advantageous method of removing such coatings by the application of heat within a non-oxidizing environment.

BACKGROUND OF THE INVENTION

Optical fibers are key components in modem telecommunications systems. Basically, an optical fiber is a thin strand of glass capable of transmitting optical signals containing a large amount of information over long distances with very low loss. In its simplest form, it is a small diameter waveguide comprising a core having a first index of refraction surrounded by a cladding having a second (lower) index of refraction. A polymeric coating surrounding the cladding protects the fiber from contamination and mechanical damage and maintains mechanical strength. Typical optical fibers are made of high purity silica glass with minor concentrations of dopants to control the index of refraction. Typical coatings are dual coatings of urethane acrylates. An inner (primary) coating having a relatively low in situ equilibrium modulus is applied directly to the glass, and an outer (secondary) coating having a relatively high modulus surrounds the primary coating.

While protective coatings are critical for most applications of optical fiber, short lengths of coating must be temporarily removed in the fabrication of optical fiber devices and during the assembly of fiber networks. Because the surface of the glass fiber is susceptible to damage from abrasion and contamination, the surface is coated with protective polymer immediately after the fiber is drawn. However the coating must be temporarily removed in the fabrication of important optical fiber devices such as fiber Bragg gratings, long period gratings, fused couplers and metalcoated regions. Moreover end portions of the coating need to be removed in fusing successive fiber segments to form a network. The fiber may be recoated after such operations.

A variety of approaches have been used to remove fiber polymeric coatings, but none have been completely satisfactory. One method is to mechanically scrape the coating off the glass using a blade and then to chemically clean the exposed glass. This approach inevitably creates surface flaws on the fiber, reducing the strength and the reliability of devices produced from it. A second method uses chemical solvents to soften or completely remove the coating. While this approach has been used in manufacturing, it is difficult to automate and involves the use of hazardous chemicals, typically in the form of concentrated acids at high temperatures. A third method uses heat to soften the coating and mechanical removal of the softened coating followed by ultrasonic cleaning with a solvent such as acetone or alcohol. Accordingly there is a need for an improved method of removing polymeric coatings from optical fiber.

SUMMARY OF THE INVENTION

In accordance with the invention, the polymeric coating is removed from a coated optical fiber by disposing the fiber within a non-oxidizing environment and applying sufficient heat to volatilize at least a portion of the polymeric coating. The result is that the coating material bursts from the fiber, yielding a clean glass surface virtually free of surface flaws. In a preferred embodiment the non-oxidizing environment is inert gas and the heat is provided by resistive filament heaters.

BRIEF DESCRIPTION OF THE DRAWINGS

The nature, advantages and various additional features of the invention will appear more fully upon consideration of the illustrative embodiments now to be described in connection with the accompanying drawings. In the drawings.

It is to be understood that these drawings are for purposes of illustrating the concepts of the invention and are not to scale.

DETAILED DESCRIPTION

Figure 1:
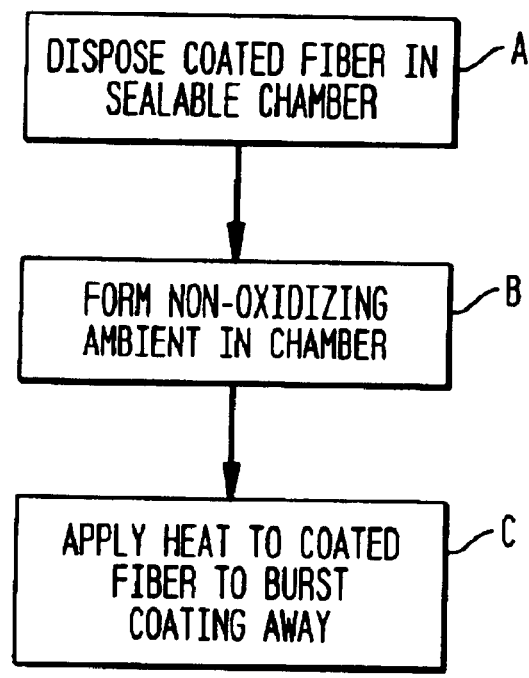
FIG. 1 is a block diagram of the steps in removing a polymeric coating from an optical fiber.

Referring to the drawings, FIG. 1 is a block diagram of the steps involved in removing a polymeric coating from an optical fiber. The first step shown in block A is to dispose the coated fiber within a sealable chamber.

The next step (block B) is to form a non-oxidizing environment within the chamber. The chamber can be evacuated to a low pressure and filled with an inert gas such as Argon. The inert gas can be at ambient pressure (e.g. 1 atm) or below.

The third step shown in block C is to apply heat to the coated fiber. The heat should be sufficient to volatilize at least a portion of the coating without changing the phase of the glass. The heat should volatilize at least the most volatile components in the coating and cause the coating to burst from the fiber (explosive removal). The heat is preferably applied from a resistive filament within the evacuated chamber or from a laser, such as an infrared laser, within or outside the chamber. In typical cases involving two-layer acrylate coatings on silica fibers, the heat provided by a resistive filament glowing at a temperature in excess of about 800° C. is adequate to effect such removal.

The heat should be applied uniformly over the length of the coating to be removed, either by use of an elongated heat source or series of sources, by translating the fiber, or by translating the source of the heat.

Figure 2:
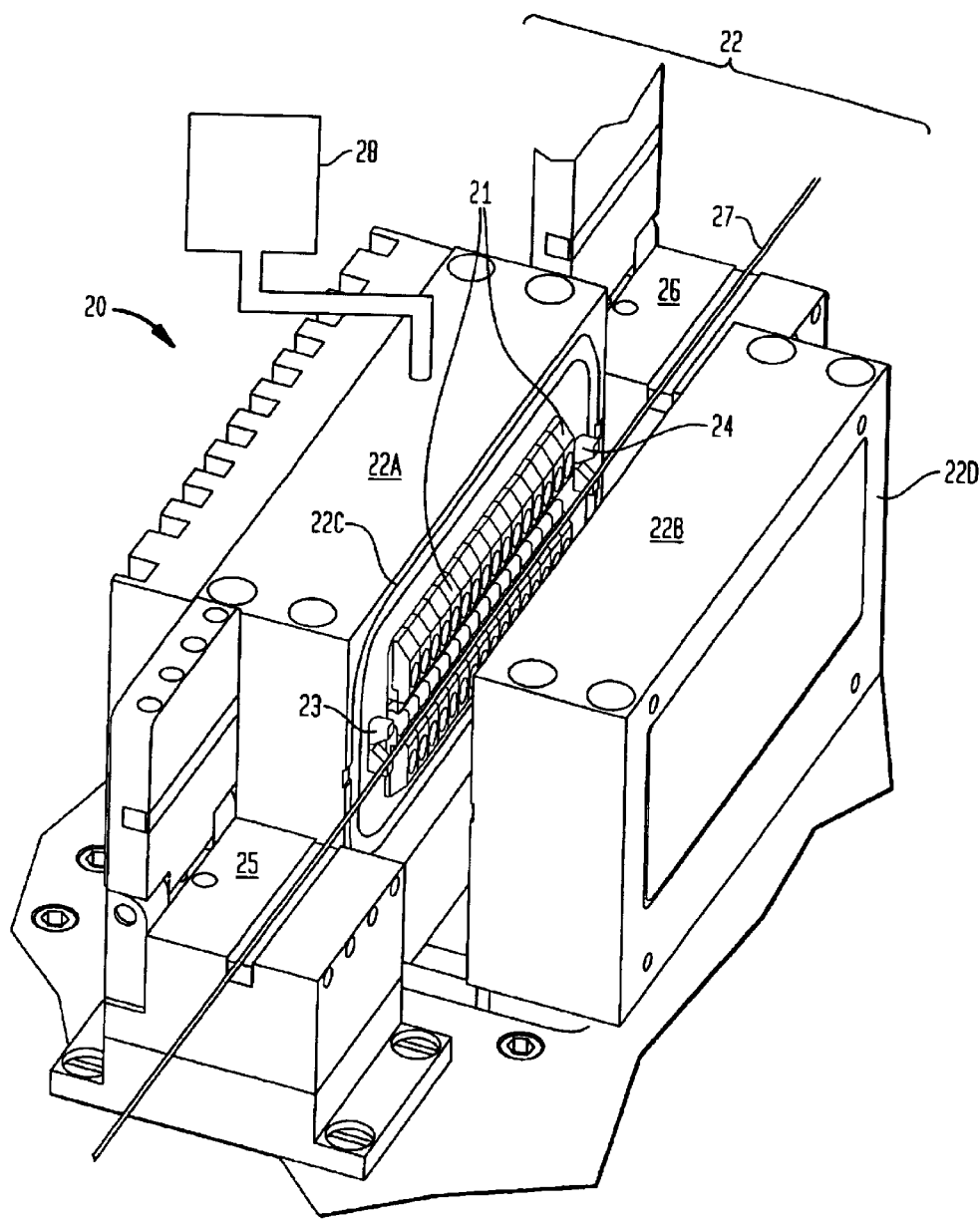
FIG. 2 illustrates apparatus useful in practicing the method of FIG. 1.

FIG. 2 is a perspective view of preferred apparatus useful in practicing the method of FIG. 1. In essence, the apparatus 20 comprises one or more resistive filament heaters 21 disposed within a sealable chamber 22. The chamber 22 advantageously is a two-part chamber comprising a first part 22A and a second part 22B which can be sealed together against an O-ring 22C and over the coated fiber 27. The chamber can include a viewing window 22D to permit the passage of light. In accordance with techniques well known in the art, an arrangement 28 of pumps, valves, tubing and gas reservoirs can be provided for pumping down the chamber and introducing non-oxidizing gas into the chamber. Preferably a serial succession of heaters 21 is placed between a pair of V-groove guides 23, 24. The succession of heaters extends along the length of coated fiber 27 from which the coating is to be removed. Fiber holders 25, 26 facilitate and maintain placement of the fiber 27.

Figure 3:
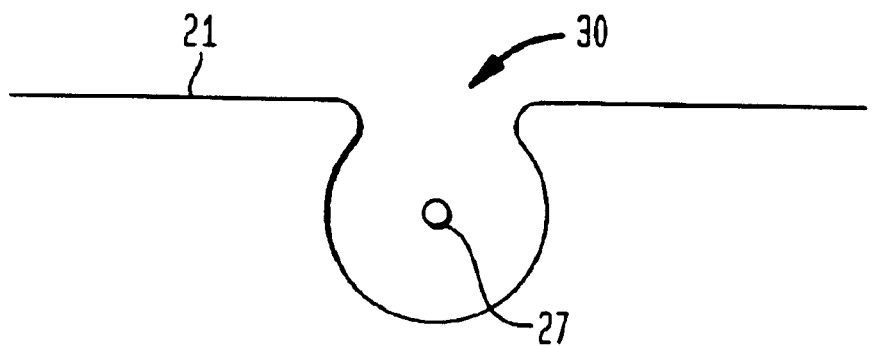
FIG. 3 illustrates a preferred resistive filament heater for use in the apparatus of FIG. 2.

As shown in FIG. 3, each filament heater 21 is advantageously a high melting temperature metal and preferably a refractory metal (e.g. iridium, tungsten or tantalum) ribbon bent in an open loop 30 shaped like the Greek letter omega. The coated fiber 27 advantageously passes through the center of the loop.

In typical operation, the coated fiber 27 is loaded into holders 25, 26 with an exposed intermediate length guided by V-grooves 23, 24 through the centers of filament heaters 21. The chamber 22 is sealed, air is pumped out and a non-oxidizing gas such as Argon is introduced. The filament heaters 21 are then heated by the application of electricity to glow red at temperatures in excess of about 800° C. and preferably to glow yellow at temperatures in excess of 1500° C. The heat volatizes portions of the coating causing the coating to burst from the fiber without mechanical assistance. Advantageously the heater is sufficiently hot to cause the coating to burst from the fiber in less than about 3 seconds and preferably less than about 1 second. This leaves a relatively clean glass surface free of mechanical damage, particulates or hazardous chemicals.

The invention can now be more clearly understood by consideration of the following example. The polymeric coating was stripped from a 1 inch section of corning SMF28 fiber using apparatus similar to that of FIG. 2. Stripping was carried out in a 1 Atm Ar environment. Unspliced stripped fiber yielded pull strengths of 600–800 kpsia. Best results were obtained in stripping dual acrylate coatings such as those surrounding Corning SMF28, Fuji Panda and 3M Tiger fibers. Dual coated fibers manufactured by Alcatel, Lucent, Fibercore and Sumitomo were found to strip in a similar manner.

It is understood that the above-described embodiments are illustrative of only a few of the many possible specific embodiments, which can represent applications of the invention. Numerous and varied other arrangements can be made by those skilled in the art without departing from the spirit and scope of the invention.

What is claimed is:

1. A method for removing a coating from a polymeric coated optical fiber comprising the steps of:
   disposing the coated optical fiber within a sealable chamber;
   filling the chamber with non-oxidizing gas; and
   exposing the fiber to at least one resistive filament heater heated to a glow temperature in excess of 800° C. to apply to the fiber sufficient heat to cause the coating to burst away from the fiber.

2. The method of claim 1 wherein the non-oxidizing gas comprises an inert gas.

3. The method of claim 1 wherein sufficient heat is applied to the fiber to cause the coating to burst away from the fiber in less than about 3 seconds.

4. The method of claim 1 wherein the at least one resistive filament heater is heated to a glow temperature $\geq 1500°$ C.

5. Apparatus for removing a coating from a polymeric coated optical fiber comprising:
   a sealable chamber, comprising a two-part chamber for sealingly engaging together about the coated optical fiber;
   means for filling the chamber with non-oxidizing gas; and
   one or more resistive filament heaters heated to a glow temperature in excess of 800° C. for heating the coated fiber along the length of coating to be removed causing the coating to burst away from the fiber.

6. The apparatus of claim 5 wherein the one or more heating elements comprise a series of resistive filament heaters, the series extending along a length of coating to be removed.

7. The apparatus of claim 5 wherein each resistive filament heater is comprised of refractory metal.

8. The apparatus of claim 7 wherein the at least one resistive filament heater is heated to a glow temperature $\geq 1500°$ C.

9. Apparatus for removing a coating from a polymeric coated optical fiber comprising:
   a sealable chamber;
   means for filling the chamber with non-oxidizing gas; and
   one or more heating elements each comprising an open loop resistive filament for heating the coated fiber along a length of coating to be removed.

10. The apparatus of claim 9 wherein sufficient heat is applied to the fiber to cause the coating to burst away from the fiber in less than about 3 seconds.

11. The apparatus of claim 9 wherein the one or more open loop resistive filaments are heated to a glow temperature in excess of 800° C. to apply sufficient heat to cause the coating to burst away from the fiber.

12. The apparatus of claim 9 wherein each open loop resistive filament is comprised of refractory metal.

13. The apparatus of claim 9 wherein the one or more open loop resistive filaments are heated to a glow temperature $\geq 1500°$ C.

14. A method for removing the coating from a polymetric coated optical fiber comprising the steps of:
   disposing the coated optical fiber within a sealable chamber;
   filling the chamber with non-oxidizing gas; and
   applying heat from at least one open loop resistive filament to the fiber sufficient to cause at least a portion of the coating to burst away from the fiber.

15. The method of claim 14 wherein sufficient heat is applied to the fiber to cause the coating to burst away from the fiber in less than about 3 seconds.

16. The method of claim 14 wherein the one or more open loop resistive filaments are heated to a glow temperature in excess of 800° C.

17. The method of claim 14 wherein the one or more open loop resistive filaments are comprised of refractory metal.

18. The method of claim 14 wherein the one or more open loop resistive filaments are heated to a glow temperature $\geq 1500°$ C.

* * * * *